Patented Sept. 11, 1945

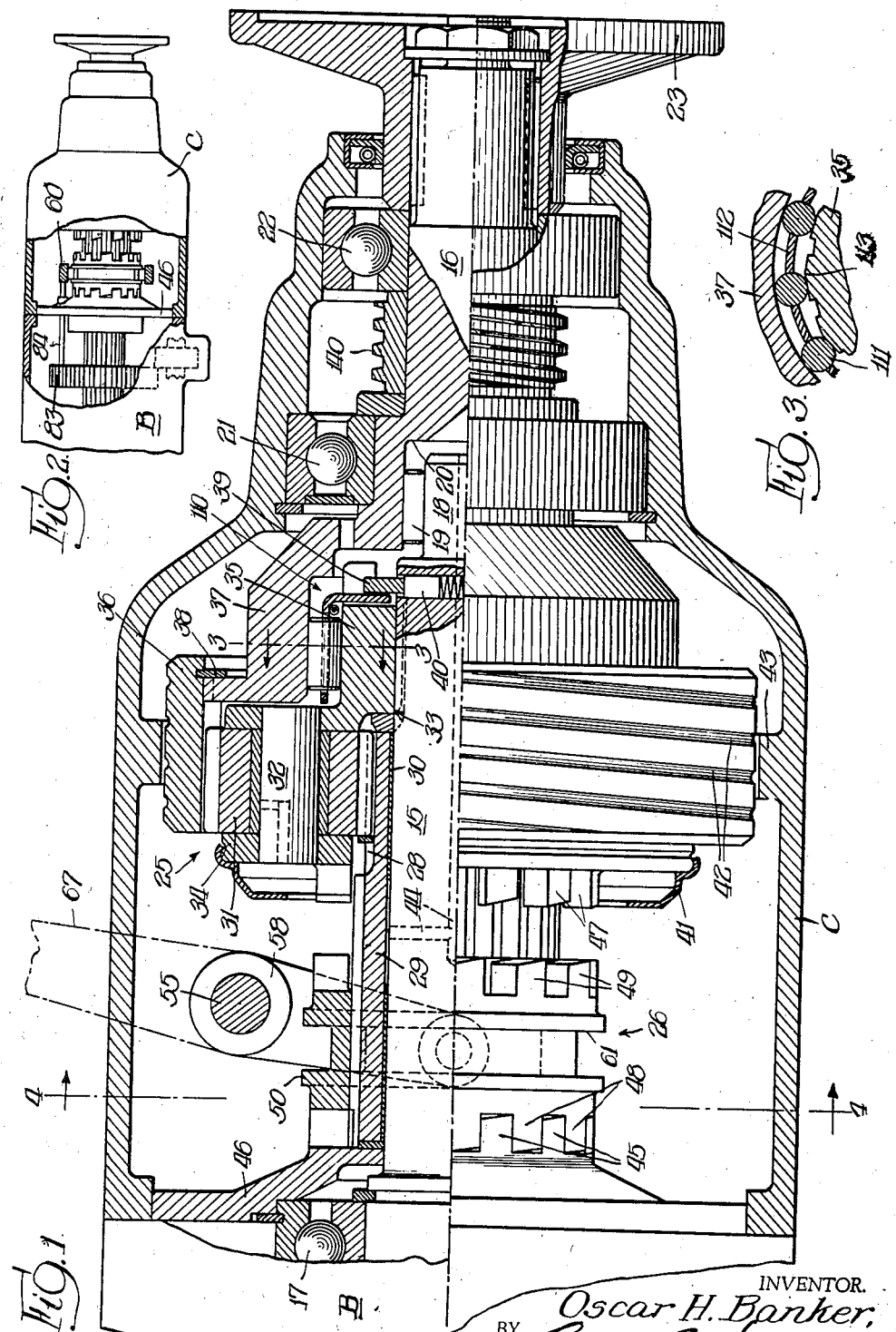

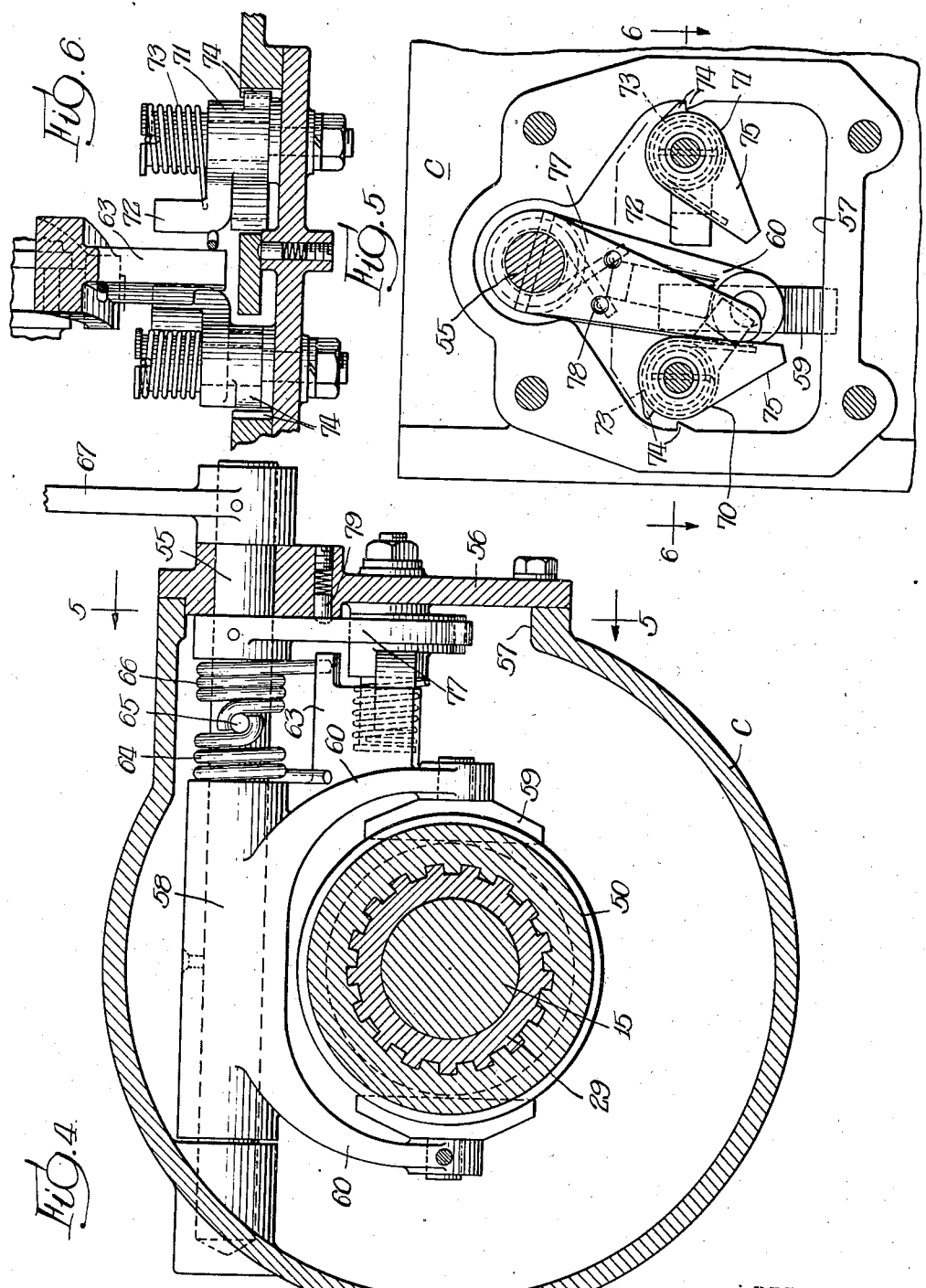

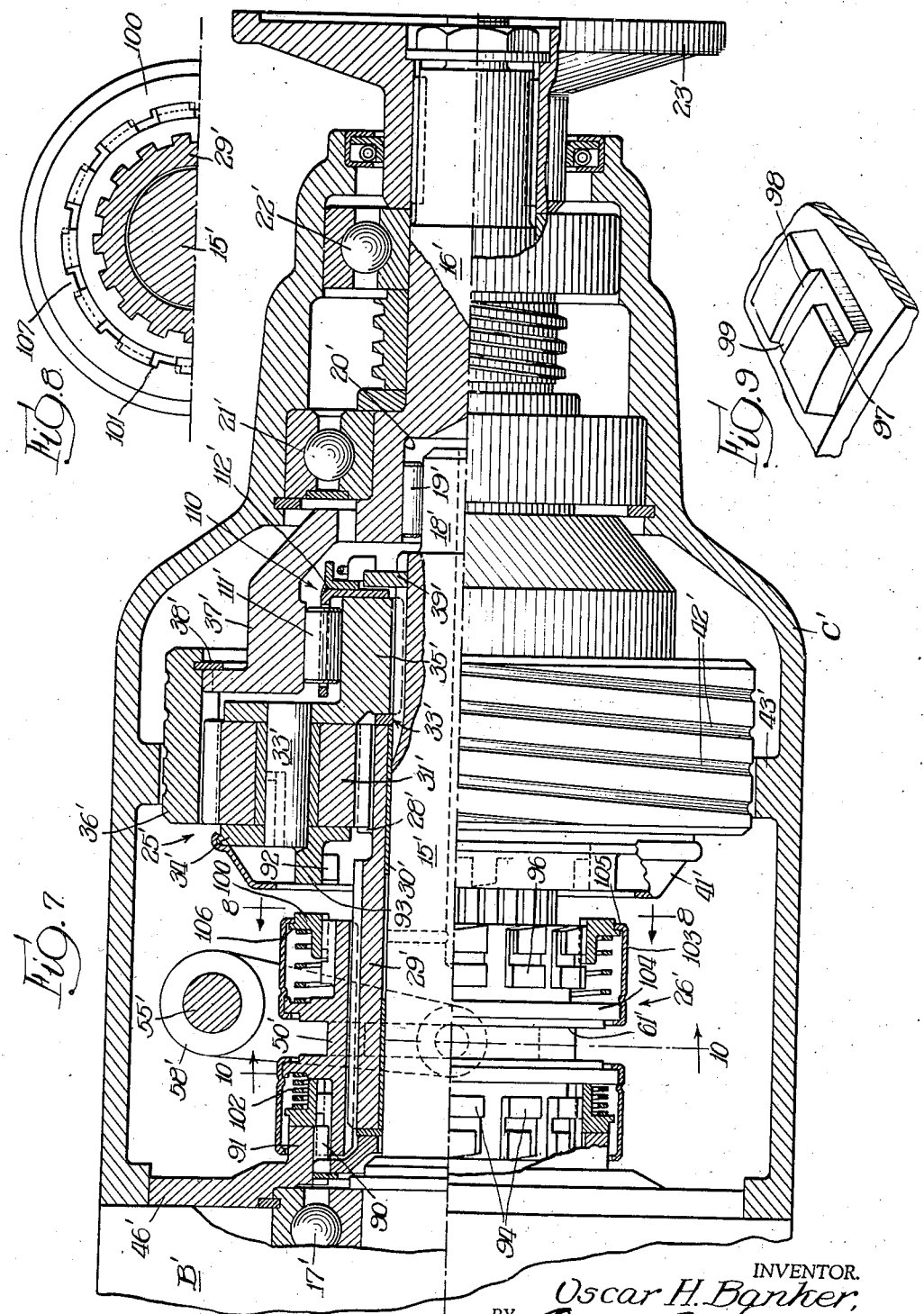

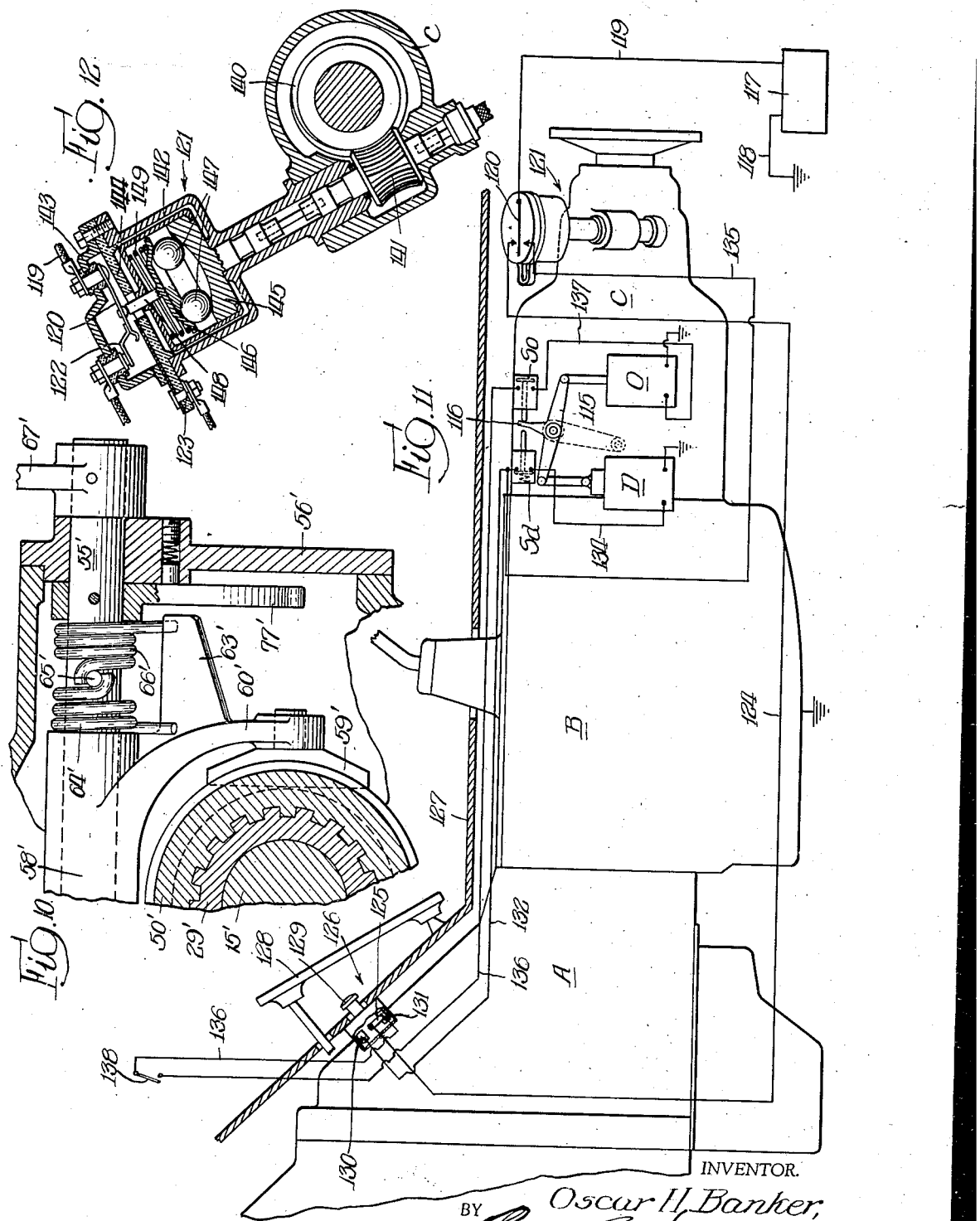

2,384,448

UNITED STATES PATENT OFFICE 2,384,448

TRANSMISSION

Oscar H. Banker, Chicago, Ill., assignor to New Products Corporation, Chicago, Ill., a corporation of Delaware Application August 15, 1938, Serial No. 224,933

2 Claims. (Cl. 74—290)

The invention relates generally to a change speed transmission and more particularly to an overdrive transmission, and has a general object to provide a new and improved transmission of that type.

A more particular object of the invention is to perfect an overdrive transmission having a planetary gear system and a clutch and brake device of the overrunning jaw type for controlling the planetary system to obtain a direct or an overdrive.

Another object is to provide an overdrive transmission having a planetary gear system and an overrunning brake of the jaw type having a stationary element and a movable element, the movable of the brake being associated with the reaction member of the planetary system to utilize the tendency of the reaction member, upon a reversal of torque in the transmission, to drop to zero speed and reverse its direction of rotation for effecting engagement of the movable element with the stationary element of the brake.

Yet another object is to provide an overdrive transmission, having a clutch and brake device of the overrunning jaw type, with new and improved means, preconditioned under manual control, to effect a shift of the movable element of the clutch and brake device upon a change in torque in the transmission.

Still another object is to provide new and improved electrical means for preconditioning the shifting means in an overdrive transmission having an overrunning jaw clutch.

A further object is to provide, in an overdrive transmission having a double ended, shiftable clutch and brake element and a pair of spaced cooperating clutch and brake elements of the overrunning jaw type, means for preventing accidental kick-back of the shiftable element from one cooperating element to the other.

Other objects and advantages will become apparent from the following detailed description taken in connection with accompanying drawings, in which:

Fig. 1 is a view, partially in vertical diametrical section and partially in elevation, of an overdrive transmission embodying features of the invention.

Fig. 2 is a reduced plan view of the transmission shown in Fig. 1 having a portion of the casing broken away to reveal certain interior construction.

Fig. 3 is a fragmentary sectional view of an overrunning clutch taken approximately along the line 3—3 of Fig. 1.

Fig. 4 is a transverse sectional view taken approximately along the line 4—4 of Fig. 1 and looking in the direction of the arrows indicated in Fig. 1.

Fig. 5 is a fragmentary view taken approximately along the line 5—5 of Fig. 4, showing the shifting means of the transmission.

Fig. 6 is a fragmentary view taken approximately along the line 6—6 of Fig. 6.

Fig. 7 is a vertical diametrical sectional view of a modified form of overdrive transmission embodying certian features of the invention.

Fig. 8 is a fragmentary transverse sectional view taken along the line 8—8 of Fig. 7.

Fig. 9 is an enlarged view of an individual tooth of the movable clutch element.

Fig. 10 is a fragmentary transverse sectional view taken along the line 10—10 of Fig. 7.

Fig. 11 is an elevational view of the transmission of an automotive vehicle having the overdrive transmission disclosed herein incorporated therewith and showing the electrical control for the overdrive transmission.

Fig. 12 is an enlarged longitudinal sectional view of one control switch of the electrical means governing the transmission.

While the invention is susceptible of various modifications and alternative constructions, it is disclosed herein and will hereinafter be described in a preferred form and one modification, but it is not intended that the invention is to be limited thereby to the specific constructions disclosed, but it is intended to cover all modifications and alternative constructions falling within the spirit and scope of the invention as defined by the appended claims.

The invention is particularly applicable for use in an automotive vehicle and, accordingly, will, for purposes of disclosure, be herein shown as embodied in such an automotive vehicle. As shown in Fig. 11, such a vehicle has a casing A which houses the conventional flywheel and friction clutch, and a casing B which houses a conventional transmission having three speeds forward and one speed reverse. Adapted to be secured to the casing B is a generally tubular casing C which houses the overdrive transmission forming the subject of this invention.

Referring first more particularly to the form of the invention disclosed in Figs. 1 to 6, the overdrive transmission housed in the casing C comprises a drive shaft 15 and a driven shaft 16 disposed in axial alinement. The drive shaft 15 may be a continuation of the driven shaft of the three speed transmission, or may be an individual shaft coupled to the driven shaft of the transmission. In either case, it preferably is journaled at the end adjacent the casing B in a ball bearing 17, while at the end adjacent the shaft 16 it is formed with a reduced portion 18 journaled in roller bearings 19 in a recess 20 in the end of the shaft 16 provided for that purpose. The shaft 16 in turn is journaled in ball bearings 21 and 22 mounted in the casing C and located respectively at the inner and the outer ends of the shaft 16. At its outer end the shaft 16 projects from the casing C and has non-rotatably secured thereto a conventional coupling plate 23.

Operatively associated with the drive shaft 15 and the driven shaft 16 are a planetary gear system, generally designated 25, and an overrunning clutch and brake device of the jaw type, generally designated 26, which is shiftable to govern the operation of the planetary gear system and thus determine whether there will be a direct drive between the shafts 15 and 16 or whether there will be an overdrive of the shaft 16. The planetary gear system 25 is generally of conventional construction and, accordingly, comprises a sun gear which herein takes the form of teeth 28 formed on one end of an elongated sleeve 29 rotatably mounted on the shaft 15. Preferably bushings 30 are interposed between the sleeve 29 and the shaft 15. Meshing with the teeth 28 forming the sun gear are a plurality of planet gears 31, only one of which is here shown, each of which is rotatably mounted on a shaft 32 mounted in a planet gear carrier, generally designated 33, and composed of an annular plate 34 in which one end of the shaft 32 is received and an annular hub 35 in which the other end of the shaft 32 is received, and which is splined to the end of the shaft 15 for rotation therewith. In turn meshing with the planetary gears 31 is an orbit gear 36 fixedly secured to an annular head 37 formed integral or at least secured to the inner end of the shaft 16. A conventional split lock ring 38 and a conventional locking ring 39 retained by spring pressed plunger 40 are provided for retaining the orbit gear 36 on the head 37 and the hub 35 on the splined end of the shaft 15. An annular guard ring 41 secured to the plate 34 may also be provided. The external circumference of the orbit gear 36 may be formed with helical grooves 42 which cooperate with an annular rib 43 to convey oil from the casing to the left of the planetary gear system, as viewed in Fig. 1 to the right thereof, and an oil duct 44 is preferably provided in the shaft 15 to supply lubricant to the bushings 30.

The overrunning jaw clutch and brake device 26 is a double ended or duplex device and, accordingly, comprises two sets of cooperating jaws or teeth. Constituting half of one such set of jaws are a plurality of jaws 45 integral with a stationarily mounted plate 46 interposed between the casing B and the casing C, and constituting one-half of the other set of jaws are a plurality of jaws 47 formed integral with the plate 34 of the planet carrier 33. Adapted to be engaged respectively with the jaws 45 and with the jaws 47 are a plurality of jaws 48 and 49 formed on opposite ends of a rotatable and shiftable element 50. These jaws have sufficient play when engaged so as to exceed any backlash in the gearing. In order to enable the overrunning of the element 50, under certain conditions while such overrunning is prevented under other conditions, the ends of all of the clutch jaws are beveled. Moreover, the direction of the bevel is chosen with a view to the direction of rotation of the shafts 15 and 16 and of the elements of the planet gear system, particularly the sleeve 29. In the present instance, all of the beveled faces lie in parallel planes.

It is a feature of this invention that the element 50 is associated with the reaction member of the planetary gear system in such a manner that the tendency of that reaction member to slow down and reverse its direction of rotation, upon a reversal of torque through the transmission, is utilized to effect engagement of the element with the stationary jaws 45 to provide for an overdrive of the transmission. Accordingly, the shiftable element 50 is slidably splined onto the sleeve 29 which, in the present instance, constitutes the reaction member of the planetary gear system. Mounted on the sleeve 29 in this manner, the shiftable element 50 is rotated at the same rate and in the same direction as the sleeve 29 and thus has imparted to it the same movements as are imparted to the reaction member of the planetary gear system as an incident to a reversal of torque through the transmission, which movements include a reduction in speed to zero at which time reversal in the direction of movement takes place. The manner in which these movements are obtained and the manner in which they are utilized to effect the engagement of the brake will presently be made more apparent.

As shown in Fig. 1, the element 50 is in overdrive position in which its jaws 48 are engaged with the stationary jaws 45. As a result, the sleeve 29 or the reaction member of the planetary gear system is held against rotation and thus rotation of the planet gear carrier 33 imparted by the shaft 15 causes the planet gears 31 to rotate about their shafts 32 in addition to being revolved about the sleeve 29, and thus the orbit gear 36 and the shaft 16 are driven at a higher rate of speed than is the shaft 15. When the element 50 is shifted to the right, as viewed in Fig. 1, so that its jaws 49 engage the jaws 47, the transmission is in direct drive for then the planet gear carrier 33 is locked to the sleeve 29 so that the entire system rotates as a unit causing the shaft 16 to rotate at the same speed as the shaft 15.

For shifting the element 50 from one position to another, means is provided (see Figs. 4, 5 and 6) which is adapted to be preconditioned under manual control to urge the element 50 in a direction to effect the engagement desired, while the actual shift takes place at a time when the operator of the vehicle momentarily decelerates the engine and thus releases and frees the element to the action of the preconditioned means. The shifting means comprises a shaft 55 extending transversely of the casing C to be journaled at one end in the casing and at the other end to be journaled in and project through a plate 56 removably secured over an opening 57 formed in the side wall of the casing C. Rotatably mounted on the shaft 55 within the casing is a yoke 58 having a shoe 59 mounted at the end of each of its arms 60 and engaging the element 50 on diametrically opposite sides in a groove 61 provided for that purpose. Through the medium of this yoke, the element 50 is shifted longitudinally of the sleeve 29 whenever the yoke 58 is rocked.

To permit preconditioning of the shifting means prior to an actual shift of the element 50, one arm 60 of the yoke 58 carries an ear 63 which projects laterally of the yoke. Engaging the ear 63 on one side thereof is a spring 64 which is coiled loosely about the shaft 55 and terminates in a hooked end having a one-way engagement with a pin 65 secured in the shaft 55. Similarly, a second spring 66 is loosely coiled about the shaft 55 and has one end engaging the ear 63 on the opposite side from the spring 64 and has its other end hooked to have a one-way engagement with the pin 65. It is believed apparent from the foregoing that by rocking the shaft 55 in one direction, for example, clockwise, as viewed in Fig. 1, the pin 65 will tension the spring 66 in a manner causing the same to urge the dog 63 and hence the shiftable element 50 to the left in Fig. 1, that is, toward overdrive position. Conversely, upon rocking the shaft 55 in a counterclockwise direction, as viewed in Fig. 1, the spring 64 will be tensioned in a manner causing it to urge the element 50 toward direct drive position, that is, toward engagement with the jaws 47. Such rocking movement may be imparted manually through the lever 67 pinned to the projecting end of the shaft or may be rocked by electrical means but under manual control, as shown in Fig. 11, and as will presently be described in greater detail.

With one of the springs 64 or 66 tensioned to shift the element 50 and with the motor of the vehicle then decelerated so as to release the driving torque through the transmission, the element 50 is freed and is immediately urged toward engagement with the other set of jaws. Engagement, however, does not immediately take place, because of the difference in rotative speed of the cooperating jaws and, as a result, there sometimes results a kick-back of the shiftable element 50 which tends to cause reengagement of the element with the jaws from which it has just been disengaged. This, of course, is undesirable and means are provided herein for preventing such reengagement as a result of a kick-back. To that end, there is pivotally mounted on the cover plate 56 a compound dog 70 and a similar compound dog 71 disposed on opposite sides of the ear 63. Each dog is formed with an abutment 72 and by means of a coil spring 73 is urged to a horizontal position of the abutment 72. Such a position is determined by means of cooperating projections 74 formed respectively on the dogs and the casing C. Also formed on each dog is a cam arm 75 spaced both angularly and axially from the abutment 72. As previously stated, the dogs 70 and 71 are disposed on opposite sides of the ear 63 and the abutments 72 are normally disposed in the path of the ear 63 so that rocking of the yoke 58 is prevented so long as the dogs are in normal position, that is, with the abutments horizontal. In order to rotate the dogs so that the abutments 72 are removed from the path of the ear 63, there is pinned to the shaft 55 an arm 77 extending downwardly between the dogs 70 and 71 in the plane of the cam arms 75 of the dogs. Thus, as the shaft 55 is rocked to shift the element 50, the arm 77 engages a corresponding one of the cam arms 75 and rotates the dog to the position shown in Fig. 5 in which position the abutment 72 is removed from the path of the ear 63. The arm 77 also serves as a means for yieldably retaining the shaft in one position or another and to that end carries detents 78 with which a spring pressed plunger 79 engages to retain the shaft 55 in one of two positions. It is believed apparent from the foregoing that any shift of the element 50 to effect engagement of its jaws with the cooperating jaws is effectively prevented by the abutment 72, unless shift in a particular direction is desired, in which instance rotation of the shaft 55 will, through the arm 77, have rotated the dog so that the abutment 72 no longer is in the path of the ear 63. Thus, should there be a kick-back at any time, reengagement will be prevented because the ear 63 cannot proceed beyond the end of the abutment 72.

The operation of the shifting means, as well as the unique association of the element 50 with the planetary gear system, can best be understood and appreciated from the following brief description of the operation of the overdrive transmission. For this purpose, let it be assumed that the overdrive transmission is operative, that is, the element 50 is engaged with the stationary brake jaws 45 so as to hold the sun gear stationary. The various parts would then be in the positions shown in Figs. 1 to 6. Let it be assumed further that the operator of the vehicle now desires to revert to direct drive. To obtain such shift to direct drive, the lever 67 is first actuated in a counterclockwise direction, as viewed in Fig. 1, which thus rocks the shaft 55 in a counterclockwise direction, as viewed in Figs. 1 and 5. With such rocking of the shaft 55, the spring 64 is tensioned so that it tends to urge the element 50, through the yoke 58, toward the right, as viewed in Fig. 1, that is, toward engagement with the clutch jaws 47. Rocking of the shaft 55 also swings the arm 77 which in its movement engages the cam arm 75 of the dog 71 and pivots the same in a counterclockwise direction so that the abutment 72 is rotated out of the path of the ear 63. Such swinging of the arm 77 frees the dog 70 to the control of its spring 73, however, the dog cannot pivot because the abutment 72 thereof is in engagement with the lower edge of the ear 63. The shaft 55 is retained in its rotated position by means of the plunger 79 engaging the appropriate detent 78.

The shifting means has now been preconditioned, however, actual shift of the element 50 does not take place because the frictional engagement of the jaws 45 and 48, due to the fact that the vehicle is still being driven therethrough, is so great that the spring 64 does not overcome that frictional engagement. To effect the shift, the operator of the vehicle next releases the accelerator pedal to decelerate the engine and with such deceleration there is a reversal in torque in the transmission, since the momentum of the vehicle now is driving the transmission instead of the vehicle being driven from the engine. If it be assumed that the shaft 15 and the shaft 16 normally rotate in a clockwise direction, as viewed in Fig. 4, then with the element 50 shifted to overdrive position the planetary gear carrier 33 and the orbit gear 36 also rotate in a clockwise direction while, as previously stated, the sleeve 29 is stationary. With the reversal of torque resulting from the deceleration of the engine, the frictional engagement between the jaws 45 and 48 is reduced, thereby permitting the spring 64 to shift the element 50 to the right, as viewed in Fig. 1, disengaging it from the brake jaws 45, thereby freeing the sleeve 29, and further urging the element 50 toward engagement with the clutch jaws 47.

Though the element 50 is urged toward engagement with the clutch jaws 47, such engagement cannot take place immediately because of the difference in rotative speeds between the carrier 33 and the element 50, and particularly because, due to reaction in the planetary gear system during the deceleration of the engine, the sleeve 29 is rotated in a counterclockwise direction, as viewed in Fig. 4. During such rotation of the element 50 and the jaws 47 in opposite directions, the engagement of the beveled faces of the jaws may tend to cause a kick-back of the element 50. However, in the present instance, reengagement of the brake jaws 45 and 48 is effectively prevented because with the initial shift of the element 50 the ear 63 was withdrawn from above the abutment 72 of the dog 70, thereby permitting the same to pivot and position the abutment 72 in the path of the ear 63. With the element 50 disengaged from the jaws 45 and urged toward engagement with the jaws 47, the operator of the vehicle now again depresses the accelerator pedal to accelerate the engine, with the result that the reaction in the planetary gear system causes the sleeve 29 to rotate in a clockwise direction, as viewed in Fig. 4, and, at the time that the shaft 15 is rotating at the same speed as the shaft 16 or just a fraction above, the element 50 will be rotating at the same speed or just a fraction above the clutch jaws 47, thereby causing the long edges of the jaws to engage and hold the two sets of jaws in synchronism, permitting final engagement of the jaws. The planetary gear system will now be locked as a unit and thus will cause the shaft 15 and the shaft 16 to operate at a direct drive in a 1:1 ratio.

To go from a direct drive to an overdrive, the operator of the vehicle again actuates the arm 67, this time in a clockwise direction as viewed in Fig. 1, to rock the shaft 55 and thus precondition the shifting means in the manner previously described. It is to be appreciated, of course, that this time the spring 66 will be tensioned and the dog 70 will be pivoted by means of the arm 77, as seen in Fig. 5. Just as previously described, actual shift of the element 50 does not take place upon the preconditioning of the shifting means but awaits release of the element 50 by a deceleration of the engine. With such deceleration, the torque of the transmission is again reversed with the drive now being applied by the motor vehicle, as distinguished from the engine, and with such change in torque the frictional engagement between the clutch jaws 47 and 49 again is reduced, permitting the spring 66 to disengage the element 50 from the jaws 47 and shift the same toward engagement with the brake jaws 45. Particular attention is drawn to the fact that, at the time of disengagement of the element 50 from the clutch jaws 47, the element 50 has been rotating in a clockwise direction, as viewed in Fig. 4, and thus at first overruns the stationary jaws 45 and no engagement takes place. However, the reaction in the planetary gear system, as a result of the deceleration of the engine, is such that it tends to rotate the sleeve 29, and hence the element 50, in a counterclockwise direction, as viewed in Fig. 4, and thus with the deceleration of the engine the sleeve 29 rotates progressively slower, finally passing through zero and tending to rotate in the reverse direction, that is, counterclockwise. It is this tendency of the reaction member of the planetary gear system, under the conditions described, to reverse its direction of rotation which is utilized to bring the element 50 down to a stationary condition for engagement with the stationary brake jaws 45. Thus, at the time of reversal of the direction of rotation of the sleeve 29, or with the first rotation in a counterclockwise direction, the long edges of the brake jaws 45 and 48 engage and permit the jaws 45 and 48 to become fully engaged. With the element 50 engaging with the stationary jaws 48, the sleeve 29 is now held stationary and thus an overdrive is imparted to the shaft 16 as before.

In order that during operation of the vehicle in reverse there may always be a direct drive between the shaft 15 and the shaft 16, the shiftable reversing gear 83 (see Fig. 2) of the three speed transmission carries a pin 84 which extends slidably through the plate 46 into abutment with one arm 60 of the yoke 58 so that when the gear 83 is shifted to the right, as viewed in Fig. 2, to place the transmission in reverse, the element 50 is also shifted over into engagement with the clutch jaws 47.

In Figs. 7 to 10 of the drawings, there is disclosed a slightly modified form of the invention. For the most part the construction of the form disclosed in Figs. 7 to 10 is the same as that disclosed in Figs. 1 to 6 and, therefore, as to the similar structure, any description would be but repetitious of what has already been described. Accordingly, the same reference characters plus a prime have been applied to like elements and for a description reference is made to the description of the disclosure in Figs. 1 to 6.

The form of the invention as disclosed in Figs. 7 to 10 differs from that disclosed in Figs. 1 to 6 primarily in the construction of the jaw clutch and brake device and of the means for eliminating the shock and noise incident to a kick-back of the shiftable element 50'. Briefly, the difference resides in the fact that the means for eliminating the shock and noise incident to a kick-back is incorporated in the clutch and brake device and this construction will now be described. As in the form of the invention previously described, the clutch and brake device has a double ended, shiftable member, and, accordingly, there are two sets of jaws. Constituting a part of one set are a plurality of jaws 90 formed internally of an annular flange 91 integral with the stationary plate 46', and constituting a part of the other set are a plurality of jaws 92 formed internally of an annular flange 93 integral with the plate 34' of the planetary carrier 33'. Adapted to engage respectively with the jaws 90 and 92 are jaws 94 and 96 formed externally on opposite ends of the element 50'.

In order that the kick-back preventing means may be incorporated in the element 50', the jaws 94 and 96 are of special construction adapted for cooperation with the kick-back preventing means. To that end, each of the jaws 94 and 96 in addition to having its front face beveled (see Figs. 7 and 9) has a notch 97 formed in its short edge extending from the beveled face inwardly to an intermediate point of the jaw whence it forms a shoulder 98. Intersecting the notch 97 at its inner end is a transverse groove 99 which has no utility, however, save to facilitate formation of the notch 97 and particularly shoulder 98.

Encircling the jaws on each end of the element 50' is an annular guard ring 100 which, as best seen in Fig. 8, is formed with a plurality of notches 101 corresponding in number to the number of jaws and each slightly wider than a jaw and corresponding in depth to the depth of the notches 97. This ring 100 is urged outwardly by a compression spring 102, but is restrained against movement off of the end of the element 50' by means of an annular retaining ring 103. The retaining ring 103 is secured to a radial flange 104 of the element 50', and at its outer edge is formed with an inturned flange 105 which is disposed in the path of an annular shoulder 106 formed on the guard ring 100 and the engagement of which thus limits the outward movement of the guard ring. It is to be noted that, when the guard ring is in its outermost position, the face of the guard ring projects beyond the face of the jaws 94 and 96 and that the diameter of the guard rings is equal to the diameter of the annular flanges 91 and 93.

It will be apparent from the foregoing description that each guard ring is mounted on an end of the element 50' for both limited rotation relative thereto and for sliding movement longitudinally thereof. Because of such mounting, the guard ring 100 may assume what may be termed a blocking position or a yieldable position. The guard ring 100 is in blocking position when it is shifted angularly with respect to the jaws 94 and 96, so that the teeth 107 formed between the notches 101 are received in the notches 97 formed in the jaws. This position is shown in Fig. 8 and it is believed apparent that when in that position the shoulder 98 of the jaws prevents longitudinal shift of the guard ring. Thus, should the element 50' be urged toward engagement while the appropriate guard ring is in blocking position, the guard ring would strike one of the annular flanges 91 or 93 and thus prevent engagement of that set of jaws and, moreover, would even prevent contact of the jaws. As will presently become more apparent, the guard ring 100 is rotated so as to disengage the teeth 107 from the notches 97 as a result of frictional engagement between the guard ring and the annular flange 91 or 93, which thus frees the guard ring for longitudinal movement permitting the same to be shifted inwardly so that it no longer blocks engagement of the clutch jaws.

As was the case in the preferred form of the invention, the operation and the unique concept of the construction here disclosed can best be understood and appreciated from a brief description of the operation. Accordingly, let it be assumed that the elements are in the positions shown in Figs. 7 to 10, which means that the transmission is now operating as an overdrive rotating the shaft 16' at a higher rate than the shaft 15'. Let it also be assumed that the shafts 15' and 16' normally rotate in a clockwise direction as viewed from the left in Fig. 7. Under these conditions, the sleeve 29' forming the sun gear of the planetary gear system is held stationary by the element 50' and thus the planet gear carrier 33' and the orbit gear 36' are also rotating in a clockwise direction, as viewed in Fig. 10 and from the left in Fig. 7.

If now the operator of the vehicle wishes to return to direct drive, he actuates the arm 67' to rock the shaft 55' in a counterclockwise direction, as viewed in Fig. 7. As an incident to such rocking of the shaft 55', the spring 64' is tensioned and thus through the ear 63' tends to shift the element 50' to the right, as viewed in Fig. 7, to effect engagement between the clutch jaws 96 and 92. Such shift of the element, however, does not immediately take place, because the frictional engagement between the jaws 94 and 90, prevents the spring 64' from effecting a disengagement.

To effect the actual shift of the element 50', the operator decelerates the engine so that there is a reversal of torque through the transmission, with the drive now being supplied by the momentum of the vehicle while the shaft 15' continues to drop in rotative speed. As a result of that reversal of torque, the frictional engagement between the jaws 90 and 94 is reduced, enabling the spring 64' to shift the element 50' to the right in Fig. 7, bringing the guard ring 100 into contact with the annular flange 93, which prevents actual engagement of the jaws until the guard ring 100 has been rotated with respect to the element 50' so as to disengage it from the shoulder 98 and free it for longitudinal movement. With such disengagement of the jaws 90 and 94, the sleeve 29' also is free to react to the reaction within the planetary gear system. The initial reaction, therefore, is to rotate the sleeve 29' and hence the element 50' in a counterclockwise direction, as viewed from the left in Fig. 7, that is, in a clockwise direction as viewed in Fig. 8, which will be counter to the direction of rotation of the clutch jaws 92. It is believed apparent that the frictional engagement between the guard ring 100 and the annular flange 93 during such counter rotation tends to retain the guard ring in its blocking position, and thus engagement of the clutch jaws is prevented. Thus, to effect final engagement of the clutch jaws, the operator again accelerates the engine and, under those circumstances, the direction of rotation of the sleeve 29' and the parts carried thereby is reversed and is in a clockwise direction, as viewed from the left in Fig. 7, that is, in a counterclockwise direction as viewed in Fig. 8. The guard ring 100 and the annular flange 93 are now rotating in the same direction, though the speed of the flange 93 may be greater than that of the guard ring 100 and thus still tends to retain the guard ring in its blocking position. However, as the speed of the shaft 15' increases, the speed of the element 50' also increases until it reaches and exceeds by a fraction the speed of rotation of the flange 93. With that momentary rotation of the element 50' at a speed in excess of the flange 93, the guard ring 100 is shifted angularly so as to free it from the shoulders 98, permitting the spring 64' which is stronger than the spring 102 to shift the element 50' the remainder of the distance into engagement with the clutch jaws 92. Since at the time of the release of the guard ring 100 the element 50' is rotating in synchronism with or slightly above the jaws 92, final engagement of the jaws 92 and 96 is effected without shock and is assured because the bevel of the jaw faces has been so designed with respect to the direction of rotation of the parts under the prescribed circumstances that the long edges of the jaws are now approaching one another. As a result, the jaws are not cammed away from one another as during overrunning of the clutch, but are caught preparatory to final engagement.

It is believed apparent from the foregoing that this modified form of construction prevents reengagement of the jaws just disengaged by eliminating any possibility of a kick-back. With this form of construction, the jaws are prevented from engaging until the appropriate speeds and directions of rotation are attained and thus no kick-back can take place. This construction also assures extreme quiet in operation, since it eliminates the noise incident to engagement of the jaws during overrunning of the clutch.

To shift the transmission from direct drive to overdrive, the operator of the vehicle again preconditions the shifting means by rocking the shaft 55' and then upon deceleration of the engine the shifting means urges the element 50' to the left, as viewed in Fig. 7, bringing the guard ring 100 into engagement with the annular flange 91. Since in direct drive the element 50' was rotating in the same direction as the shaft 15', namely, in a clockwise direction as viewed from the left in Fig. 7, during the initial contact of the guard ring 100 with the flange 91 the frictional engagement will tend to retain the guard ring in its blocking position. However, with the reversal in torque resulting from a deceleration of the engine, the reaction in the planetary gear system causes the sun gear, that is, the sleeve 29' to pass through zero speed of rotation and tend to reverse its direction of rotation. Consequently, with the first tendency toward reversal in the direction of rotation of the element 50', the frictional engagement between the flange 91 and the guard ring 100 will rotate the guard ring relative to the element to free it and permit the spring 66' to shift the element 50' further and effect actual engagement of the jaws 90 and 94. Since at the time of the release of the guard ring 100, the element is rotating at substantially zero speed or is rotating at a very low speed in a counterclockwise direction, as viewed from the left in Fig. 7, engagement of the jaws 94 with the stationary jaws 90 may take place without shock. Thus, it will be apparent that in this form the tendency of the reaction member of a planetary gear system to come to a stop and then tend to reverse its direction of rotation is utilized both to bring the element 50' down to zero speed of rotation so as to enable its engagement with stationary jaws and also to shift the guard ring 100 so as to free the element for engagement.

In both the construction disclosed in Figs. 1 to 6 and the construction disclosed in Figs. 7 to 10, there is interposed between the drive shaft 15 and the driven shaft 16 a one-way overrunning clutch, generally designated 110 in Figs. 1 to 6, and by a corresponding character plus a prime in Figs. 7 to 10. More specifically, this overrunning clutch comprises a plurality of rollers 111 (see Fig. 3) spaced by a retainer ring 112 and interposed between the hub 35 of the planet gear carrier and the head 37 of the shaft 16. The hub 35 is formed with cam surfaces 113 in well known manner functioning upon relative rotation between the hub 35 and head 37 in one direction to permit free rotation, while functioning upon relative rotation in the opposite direction to wedge the rollers 111 and thus prevent such relative rotation. In the present instance the overrunning clutch 110 is so arranged that the shaft 16 may overrun the shaft 15 but that the shaft 15 may not overrun the shaft 16. This one-way overrunning clutch may be incorporated as shown and utilized as a safety factor, insuring not less than a direct drive at all times even should the element 50 fail to engage with the planetary gear carrier. Or this overrunning clutch may be relied upon exclusively to effect a direct drive between the driving and driven shafts and one set of jaws, that is, those operating to lock the planetary gear system to operate as a unit, may be eliminated.

As previously stated, the element shifting means may be preconditioned by direct manual actuation, or electrically under manual control. Accordingly, there is disclosed in Figs. 11 and 12, an electrical control system which may be utilized with either the form of the invention shown in Figs. 1 to 6, or that shown in Figs. 7 to 10. When the electrical system is employed, the arm 67 is replaced by a beam 115 which is fixedly secured to the projecting end of the shaft 55. The beam 115 has connected to one end a solenoid device O and to its other end a solenoid device D for rocking the same, and intermediate its ends it has projecting therefrom at right angles a finger 116 extending between the plungers of two spring closed switches So and Sd.

Electrical energy for the solenoid devices O and D is supplied from a storage battery 117, one terminal of which is connected to ground by means of a lead 118 and the other terminal of which is connected by a lead 119 to the movable contact 120 of a centrifugal switch device, generally designated 121. The movable contact 120 is disposed between two stationary contacts 122 and 123, of which contact 122 is connected by a lead 124 to a rotatable contact 125 of a two-way foot switch 126 mounted on the floor boards 127 of the vehicle beneath the accelerator pedal 128. The switch 126 is of well known construction, usually including a one-way clutch not shown, operating upon a first depression and release of its plunger 129 to rotate the contact 125 into engagement with a stationary contact 130 and upon a subsequent depression and release of its plunger 129, to rotate contact 125 into engagement with a stationary contact 131. The stationary contact 130 is by a lead 132 connected to one terminal of the switch Sd, the other terminal of which is connected by a lead 134 to one terminal of the solenoid device D which has its other terminal connected to ground, as shown, to complete a circuit for the solenoid.

A second circuit for the solenoid device D is provided which includes the centrifugal switch device 121, but which does not include the switch 126. To that end the stationary contact 123 of the centrifugal switch device 121 is connected by a lead 135 to the lead 132. Thus, with the switch Sd closed, the solenoid device D may be energized whenever the switch 126 is actuated to engage contacts 125 and 130 regardless of whether the movable contact 120 of the centrifugal switch device is in engagement with the contact 122 or the contact 123. The solenoid device D will also be energized whenever the movable contact 120 of the switch device 121 engages contact 123 regardless of the position of the switch 126.

To provide a circuit for the solenoid device O, the contact 131 of the switch 126 is connected by a lead 136 to one terminal of the switch So, the other terminal of that switch being connected by a lead 137 to a terminal of the solenoid device O, which has its other terminal grounded to complete the circuit. Interposed in the lead 136 is a hand switch 138 preferably mounted on the instrument panel (not shown) of the vehicle. With but a single circuit for the solenoid device O, it is apparent that switch 126 and the hand switch 138 exercise complete control of the solenoid device O. However, when these two switches are closed to complete the circuit and when the switch So also is closed, the energization of the solenoid is under the control of the centrifugal switch device 121.

The centrifugal switch device 121 is adapted to be driven from the means driving the speedometer of the automotive vehicle which, as best seen in Figs. 1 and 12, comprises a worm 140 secured to rotate with the shaft 16 and a worm wheel 141. While the construction of the centrifugal device per se forms no part of the invention, it comprises briefly a lower casing section 142 and an upper or cap section 143 divided from the lower section by a wall 144 of insulating material. The upper section contains the switch contacts proper which have previously been mentioned, while the lower section contains the centrifugal means. This centrifugal means consists simply of two saucer-shaped members 145 and 146 between which are disposed a pair of balls 147. The member 145 is connected to the worm wheel 141 to be rotated thereby, while the member 146 carries a pin 148 which projects through an aperture in the wall 144 to engage and shift the movable contact 120. A compression spring 149 urges the member 146 into contact with the balls 147. As shown in Fig. 12, the balls 147 have been thrown outwardly by centrifugal force and have shifted the member 146 upwardly to cause engagement of the contact 120 with the contact 122. This centrifugal switch device may be pre-set so as to cause a shift of the contact 120 when the vehicle has reached any predetermined speed. For exemplary purposes, it will be assumed that the device disclosed herein has been set for a speed of 30 miles.

The operation of the electrical control means is believed readily understood from the description thereof, so that a brief summary will suffice. The hand switch 138 is provided for the purpose of definitely cutting out the overdrive against all contingencies and thus is normally left closed unless the operator of the vehicle does not wish to use the overdrive under any conditions. Let it be assumed, therefore, that the switch 138 is closed and that the elements of the electrical control system as well as of the transmission are in the position shown in the drawings, that is, that the transmission is operating at overdrive and that the vehicle is traveling at a rate in excess of 30 miles an hour, so that the centrifugal device 121 has engaged contacts 120, 122. Should the operator now wish to return to direct drive, he actuates the switch 126 by quickly depressing the accelerator pedal 128. The contacts 125, 130 will now be closed and, since the switch Sd already is closed, a circuit will be completed through the lead 124, the contacts 122, 120 of the switch device 121, and the lead 119, energizing the solenoid device D. As a result, the beam 115 will be rotated thereby rocking the shaft 55 to precondition the shifting means for the element 50. Upon release of the accelerator pedal 128, actual shift of the shiftable element will then take place, as previously described.

As an incident to the rotation of the beam 115, the switch Sd has been opened and the switch So has been closed, thereby preconditioning the circuit for the solenoid device O. The transmission is now in direct drive and, though the switch So has been closed, it will remain in direct drive regardless of the speed at which the vehicle is driven and thus regardless of the condition of the centrifugal switch device 121. To return to overdrive, the operator again momentarily depresses the accelerator pedal 128 to actuate the switch 126. With such actuation the contacts 125, 131 are engaged and, since the switch So is now closed a circuit to the solenoid device O will be completed, provided the contacts 120, 122 are closed, that is, on condition that the vehicle is being driven at a rate in excess of 30 miles an hour. If it be assumed that that speed has been reached, the circuit will be completed and the solenoid device O energized to shift the beam 115 to the position shown in Fig. 11, which then preconditions the means for shifting the element 50. Upon release of the accelerator pedal 128, the actual shift of the element then takes place as previously described and the transmission is in overdrive.

With the switch 126 in a position closing contacts 125 and 131, the transmission will remain in overdrive only so long, however, as the vehicle is driven at a rate in excess of 30 miles an hour, for when the speed drops below that rate the centrifugal device 121 will permit contact 120 to engage contact 123, thereby completing a circuit to the solenoid device D through the lead 135, which would then condition the transmission for a return to direct drive. Thus when the switch 126 is in position to have its contacts 125 and 131 in engagement, control of the solenoid device is under the centrifugal switch device and thus will be conditioned to effect a shift of the transmission to overdrive or to direct drive, depending upon whether the speed of the vehicle is in excess of or below 30 miles an hour.

I claim as my invention:

1. In a change speed transmission, a drive shaft, a driven shaft, a planetary gear system operatively connected between said shafts, and an overrunning clutch and brake device of the jaw type for governing the operation of said planetary gear system comprising a first set of jaws, a second set of jaws adapted to be engageable with said first set, at least one set of jaws being associated with the planetary gear system, and said sets being mounted for relative rotational and axial shifting movement, and means associated with one set of jaws operable while there is relative rotation between the sets of jaws in one direction to prevent contact of the jaws and operating upon relative rotation between the jaws in the opposite direction to permit engagement of the jaws.

2. A change speed transmission comprising a drive shaft, a driven shaft, a planetary gear system operatively connected between said shafts and including a planet gear carrier and a reaction member operable when stationary to cause said planet gear system to effect an overdrive of said driven shaft and operable when rotating as a unit with the planet gear system to effect a direct drive of the driven shaft, a overrunning clutch and brake device of the jaw type comprising a first set of jaws stationarily mounted, a second set of jaws mounted on said planet gear carrier, and a element having on opposite ends sets of jaws for cooperation respectively with the stationary jaws and with the jaws on said carrier, said element being non-rotatably but slidably mounted on said reaction member to partake of the movements thereof and to be shifted into engagement with one or the other set of jaws, means adapted to be potentiated to effect a shift of said element to disengage the element from one set of jaws and urge it toward engagement with the opposite set of jaws upon a temporary reduction in the speed of said drive shaft relative to the driven shaft, guard means carried on one end of said shiftable element having a blocking position in which it cooperates with means on the planet carrier to prevent contact of the jaws on the shiftable element with the jaws on the carrier, and a released position in which contact of the jaws is permitted, said guard means being shifted to blocking or released position by frictional engagement and being so constructed that it is retained in blocking position during the rotation of the element upon deceleration of the drive shaft following disengagement of the element from the stationary jaws and during acceleration of said drive shaft until the speed of rotation of the element just exceeds the speed of rotation of the planet gear carrier, and similar guard means mounted on the other end of said element operating to prevent engagement of the element with the stationary jaws during deceleration of the drive shaft following disengagement of the element from the jaws on the planet gear carrier, said last mentioned guard means being retained in blocking position until after reversal in the direction of rotation of said reaction member during such deceleration of the drive shaft takes place.

OSCAR H. BANKER.